Patented Aug. 16, 1932

1,872,254

UNITED STATES PATENT OFFICE

ANTHONY G. DE GOLYER, OF NEW YORK, N. Y.

METHOD OF WELDING

No Drawing.   Application filed April 10, 1931. Serial No. 529,295.

This invention relates to a new method for welding metals, and relates particularly to a method of welding which comprises utilizing the exothermic values of reaction of an intermetallic compound containing boron with metallic oxide in conjunction with heat supplied by the electric arc, oxyacetylene flame or other means.

The production of a satisfactory weld by either the present electric or gas welding methods, by reason of certain physical conditions, generally requires the use of a much greater number of thermal units than the amount theoretically required for the actual work performed in welding. The principal factors governing the use of such excess thermal units are:

(a) The thermal conductivity of the metal being welded.

(b) The rate of radiation of heat from the weld area.

(c) The melting point or points of the weld metal and base metal.

(d) The number of thermal units which can be supplied to a restricted weld area in a given time.

It is evident that when the values of either or both of the factors (a) and (c) are materially increased and the value of (d) remains constant, that the time required for effecting a given weld will be increased. There are definite physical limitations governing the quantity of thermal units which can be supplied to a weld area, or more specifically to the crater of molten metal in a given unit of time by means of the electric arc or the combustion of gases. Hence we find that the values of factors (a) and (c) largely determine the time or quantity of thermal units required to produce a given weld.

When physical conditions make necessary the prolonged heating of a given area to produce a satisfactory weld, a relatively large percentage of the thermal units will be conducted through the metal being welded, or radiated from the weld area, with the result that the thermal efficiency of the operation will be comparatively low. Prolonged application of heat at the weld area results in an appreciable increase in temperature in metal surrounding the weld area and the objections to such overheating are well known. As an example of the important effect of any one of the above factors, I cite copper, the high thermal conductivity of which frequently makes it impossible or difficult to form satisfactory welds of this metal. As a further example, the melting points of tungsten, tungsten carbide and several other metals, carbides and borides are so high that it is not possible to effect a weld of such metal or compound with the oxyacetylene flame. It is also impossible or uneconomical to effect a true weld of tungsten, tungsten carbide, etc. by means of the electric arc process, the limited application of such refractory metals or compounds now being accomplished by applying solid tungsten or tungsten carbide to steel or other metals having melting points lower than 1600° C; fusing the steel to form a bond or matrix holding solid particles of tungsten or tungsten carbide. It will be evident that the surface so produced does not possess all of the important properties of pure or substantially pure tungsten, tungsten carbide or other highly refractory metals or compounds.

Thus the welding of many metals, alloys and compounds depends largely on the number of thermal units which can be applied to a restricted area of metal in a short unit of time, such as gram calories per minute. Therefore, it may be stated that the greater the number of thermal units input per unit of time to the crater, i. e., a restricted area of molten metal, the less time required to effect a weld within such area. Hence, it follows that the higher the rate of input of thermal units per unit of time, the higher will be the thermal efficiency of the operation, as the percentage of thermal units usefully applied in welding is determined largely by the time required to effect a given weld. It will be apparent that when a large volume of thermal units is applied to the crater in a short unit of time, that the temperature in the crater will be greater than when a lesser number of thermal units is applied in the same unit of time.

It is generally understood that welding equipment, either electric or gas, now available restricts the volume of thermal units which can be introduced per second to what may be termed an average weld area. Therefore, many welding operations which are desirable or would be advantageous can not be efficiently or economically carried out by means of methods heretofore available.

I have discovered that refractory metals and alloys or metals and alloys having high thermal conductivity can be rapidly and efficiently welded by means of utilizing the exothermic values of the reaction of certain intermediate compounds containing boron, i. e., borides, or chemical compounds of boron with metal, with metallic oxides in conjunction with heat supplied by the electric arc, oxyacetylene flame or mechanical means. I have found that by means of the process of this invention I can effect fusion and produce true welds of tungsten, tungsten carbide, chromium, chromium carbide, molybdenum, molybdenum carbide, vanadium, vanadium carbide, uranium, uranium carbide, titanium, titanium carbide, tantalum, tantalum carbide, and other metals, alloys or compounds of metals or metalloids and that such welding operations can be readily carried out in conjunction with either the electric arc or the oxyacetylene methods. Furthermore, I have found that by means of this process I can effect rapid and entirely satisfactory welds of metals having high thermal conductivity such as copper and silver and alloys of these metals.

My present process may be carried into effect by introducing at the area to be welded an oxide of metal which is to form an essential component of the weld and a quantity of intermetallic boron compound sufficient to react with and reduce to metal substantially all of the metallic oxide present. The metallic oxide and boride reducing agent may be more or less intimately mechanically mixed and such intermixture may be in the form of powder, grains, lumps, or rods. The intermixture may be mixed with, or applied in conjunction with any metal to be added to the weld. However, it is not essential to have the intermixture of metallic oxide and reducing agent mixed or used in conjunction with metal. The intermixture of metal oxide and boride may be employed independently, or may be used as a coating on a rod or other metal form; or metal may be employed as a cover or holder for the intermixture of metal oxide and boride; or metal may be introduced at the weld area more or less simultaneously with the intermixture of metal oxide and boride.

The intermixture of metal oxide and boride reducing agent introduced at the weld area is heated by an electric arc, oxyacetylene flame or other mechanical means, to a temperature sufficiently high to insure reaction of the boride and resultant reduction of substantially all of the metal oxide to metal. I have found that the intermetallic compounds of boron specified herein react with a large number of metal oxides at temperatures between 500° C. and 750° C. to reduce such oxides to the metallic state and that such reactions are generally highly exothermic. Consequently the operation of this process produces an extremely high temperature within the area being welded which results in the rapid and complete fusion of even highly refractory metals and compounds such as tungsten, molybdenum, tungsten carbide, molybdenum carbide, chromium carbide, etc. In this manner my process provides an efficient and economical method for materially increasing the volume of thermal units which can be introduced within any given time to a weld area with the added advantage that a high percentage of the thermal units so introduced are utilized in performing work in a restricted area. By introducing thermal units in this manner I have found that a larger percentage of the thermal energy available is usefully applied than when thermal units are introduced by any heretofore proposed method.

I have found that for the welding of certain refractory metals, such as tungsten, molybdenum, tungsten carbide, molybdenum carbide, chromium carbide, manganese steel, etc., I can use a more or less mechanical mixture of metal oxide and boride; or metal or metal carbide, metal oxide and boride; or a mixture of metal or metal carbide, metal oxide, carbon and boride.

When the composition is applied in the form of a rod in electric arc welding the rod may be used to carry the current, and the arc may be drawn between the end of such rod and the metal welded, or the rod or other form may be introduced in or adjacent to an arc drawn between a carbon or metallic electrode and the metal welded.

When the composition is to be applied by means of the oxyacetylene or other gas flame, the rod, grains or other forms are introduced directly into the weld area and the flame applied thereto.

Regardless of the means employed for heating, the operation of the composition is substantially the same. The heat supplied to the weld area aids in melting the metal being welded and any metal being added, and also raises the temperature of the metal oxide and boride to a point at which the boride will react to reduce the oxide, and in general such borothermic reactions are sufficiently exothermic to melt the resultant metal and to raise the temperature of the metal welded.

The input of thermal units per unit of time can be regulated by varying the ratio of the thermal units introduced by borothermic reaction. In general, the greater the percentage of metal introduced through the reduction of metal oxide by boride, the greater will be the input of excess thermal units, i. e., in addition to thermal units supplied by the electric arc, oxyacetylene flame, etc. I have found that while it is usually desirable to add between five percent and one hundred percent of the weld metal by borothermic reaction, I can successfully add one percent or less of the weld metal in this manner.

The percentage of boride reducing agent used is regulated by the percentage of metal oxide in the composition. The process can be successfully operated by using the amount of boride theoretically required to completely reduce the metal oxide present, or an excess or deficiency of boride may be used. When the presence of boron in the finished weld is not desired, it is advisable to use, as a reducing agent, a boride which is substantially insoluble in the base metal or weld metal. It will be understood that more than one essential component can be added to weld metal by means of reduction of suitable metal oxides with boride. For example, a steel containing definite percentages of iron, chromium and nickel can be welded through supplying to the weld area any one or more of the above metals and supplying, in addition, any one or more of the metals iron, chromium or nickel by means of reduction of the oxide of such metal with boride in accordance with this process. I have found that I can substitute in part for the intermetallic boron compound other metallic reducing agents which react exothermically with metal oxide, such, for example, as aluminum, silicon, magnesium, calcium, barium, lithium, sodium, etc.

Although the process of this invention is particularly adapted to the efficient, rapid and economical welding of metals or metal compounds, such as carbides, borides and silicides having high melting points, or of metals such as copper or silver having high thermal conductivity, it will be understood that it can be successfully and economically applied for the welding of virtually all metals and compounds of metals with carbon, boron or silicon.

I have found that a number of different borides can be utilized in the operation of this process such, for example, as borides of one or more of the following elements: aluminum, barium, calcium, carbon, lithium, magnesium, manganese, silicon and titanium. When it is desirable to use a boride which is substantially insoluble in the metal welded, the weld metal or both, I have found that intermetallic compounds of boron with barium, calcium, lithium, silicon and magnesium are particularly valuable. It will be evident that when a boride is employed which is not soluble in either the welded metal or the weld metal that no residual metallic impurities can result from the use of the intermetallic boron compound and consequently the composition and character of the metals entering into the weld will not be altered.

I claim:

1. The method of welding metal which comprises introducing into the area to be welded metal oxide and an intermetallic compound of boron and supplying heat thereto within the area to be welded.

2. The method of welding metal which comprises introducing into the area to be welded a mixture of metal, metal oxide and an intermetallic boron compound, and supplying heat thereto within the area to be welded.

3. The method of welding metal which comprises introducing into the area to be welded metal, metal oxide and an intermetallic compound of boron; heating the metal oxide and intermetallic compound of boron to a temperature at which the intermetallic compound of boron reacts with the metal oxide exothermically.

4. The method of welding metal which comprises introducing into the area to be welded metal oxide and an intermetallic compound of boron with material selected from the following group: aluminum, barium, calcium, carbon, lithium, magnesium, manganese, silicon and titanium.

5. The method of welding metal which comprises introducing into the area to be welded a mixture of metal, metal oxide and an intermetallic compound of boron with material selected from the following group: aluminum, barium, calcium, carbon, lithium, magnesium, manganese, silicon and titanium.

6. The method of welding metal which comprises introducing in the weld area metal, an intermetallic boron compound and oxide of metal selected from the following group: tungsten, molybdenum, uranium, chromium, vanadium, iron, nickel, cobalt, tantalum, titanium and zirconium; and supplying heat thereto to bring the intermetallic boron compound and the metal oxide to exothermic reaction.

Signed at New York in the county of New York and State of New York this 7th day of April, 1931.

ANTHONY G. de GOLYER.